United States Patent [19]

Marcus

[11] 4,452,375
[45] Jun. 5, 1984

[54] MANUFACTURE OF DRAW-REDRAW CANS USING STEEL SHEET MATERIAL FILM LAMINATED OR EXTRUSION COATED WITH A HIGH DENSITY POLYETHYLENE GRAFT COPOLYMER

[75] Inventor: Stanley A. Marcus, Coleman, Mich.

[73] Assignee: The Dow Chemical Company, Midland, Mich.

[21] Appl. No.: 250,441

[22] Filed: Apr. 2, 1981

[51] Int. Cl.³ .............................................. B65D 90/04
[52] U.S. Cl. .................................... 220/458; 220/456; 72/46
[58] Field of Search .................................. 220/454–458; 72/347–349, 46; 428/344, 345, 349, 461, 483

[56] References Cited

U.S. PATENT DOCUMENTS

| | | | |
|---|---|---|---|
| 2,406,039 | 8/1946 | Poedel | 117/132 |
| 3,671,295 | 6/1972 | Ravve | 171/93.31 |
| 3,679,513 | 7/1972 | Addinall | 186/309 |
| 3,795,540 | 3/1974 | Mildner | 117/226 |
| 3,826,628 | 7/1974 | Addinall | 29/195 |
| 4,292,463 | 9/1981 | Bow | 174/107 |

FOREIGN PATENT DOCUMENTS

| | | |
|---|---|---|
| 2614660 | 10/1977 | Fed. Rep. of Germany . |
| 2939986 | 6/1980 | Fed. Rep. of Germany . |
| 2933574 | 3/1981 | Fed. Rep. of Germany . |
| 54-133578 | 10/1979 | Japan . |
| 55-18171 | 5/1980 | Japan . |
| 55-79139 | 6/1980 | Japan . |

*Primary Examiner*—Leon Gilden
*Attorney, Agent, or Firm*—J. B. Guffey; D. R. Howard

[57] ABSTRACT

The use of organic solvent-based coating compositions in the preparation of plastic coated steel feedstock for use in the manufacture of retortable draw-redraw food and beverage cans is substantially reduced or eliminated by using as such can feedstock a laminated or extrusion coated steel sheet having adhered to at least one, and preferably to both, major planar surface(s) thereof a layer of an adhesive synthetic thermoplastic resin composition having a crystalline melting point of at least about 250° F. and comprising graft copolymer of high density polyethylene with an ethylenically unsaturated carboxylic acid monomer.

10 Claims, 2 Drawing Figures

MANUFACTURE OF DRAW-REDRAW CANS USING STEEL SHEET MATERIAL FILM LAMINATED OR EXTRUSION COATED WITH A HIGH DENSITY POLYETHYLENE GRAFT COPOLYMER

BACKGROUND OF THE INVENTION

In one aspect, the present invention relates to the manufacture of metallic food and beverage cans and more particularly to the manufacture of 2-piece cans via a draw-redraw metal forming process. In another aspect, the present invention relates to the use of an extrusion coated or film laminated plastic/metal/plastic laminate as the can body feed stock in a draw-redraw steel can forming process.

Metallic cans of various types and sizes find widespread commercial use in the packaging of a wide variety of foods and beverages. In such food and beverage packaging usage, it is generally desired to avoid direct contact between the food or beverage to be packaged and the metallic substance from which the container is manufactured. To that end, metallic cans for food and beverage packaging are typically coated on at least their interior surfaces with a coating of a relatively inert organic substance.

Historically, such organic can coatings were typically deposited or applied from relatively low solids organic solvent-based solutions. However, in more recent times, environmental concerns and regulations requiring substantial reductions in airborne emissions from various industrial facilities have prompted a need for can coatings and can coating processes involving substantially less organic solvent usage (and thus substantially less potential for undesired airborne organic solvent emissions) than is normally encountered with the use of said low solids content organic solvent-based coating systems.

In response to the aforementioned environmental concerns and the attendant need for reduced solvent emission, certain waterborne and high solids organic solvent-based can coating compositions have been developed. Unfortunately, while such waterborne and high solids organic solvent-based systems appear to be potentially suitable for use in certain types of can manufacturing operations (e.g., as coatings in the manufacture of 3-piece rolled and seamed cans and in coating the exterior and/or interior surface of preformed aluminum and/or steel cans made by the draw and iron can forming process), they are not generally satisfactory for use in draw-redraw can forming processes in which a pre-coated steel can stock is employed and in which the coating on such can stock is required to withstand rather severe mechanical stresses involved in the can forming operation. Moreover, even the organic solvent or plasticizer based polyvinyl chloride, epoxy and epoxy phenolic systems conventionally employed to prepare can sheet or coil stock for use in draw-redraw can forming operations are somewhat limited in terms of the maximum depth to diameter draw ratio (or severity of draw) which can be tolerated without coating failure.

In view of the foregoing, it is an object of the present invention to provide an improvement in the manufacture of steel food or beverage cans by the draw-redraw process whereby the use of organic solvent-based coatings for the steel feed stock can be substantially reduced or eliminated. In addition, it is also an object of this invention to provide a means by which retortable draw-redraw containers can be manufactured from film laminated or extrusion coated steel sheet material while still maintaining equal or greater depth to diameter draw ratio capability relative to that currently possible using the conventional organic solvent or plasticizer based coating technology.

SUMMARY OF THE INVENTION

These and other objects are achieved in accordance with the present invention by the use, as the coated steel feedstock in a draw-redraw process for the manufacture of steel food or beverage can bodies, of a laminated or extrusion coated steel sheet material having directly adhered to at least one (and preferably to both) major planar surfaces thereof a layer of an adhesive synthetic thermoplastic resin composition having a crystalline melting point of at least about 250° F. and comprising a graft copolymer of high density polyethylene with from about 0.5 to about 15 weight percent, based upon such graft copolymer, of an ethylenically unsaturated carboxylic acid monomer. Optionally, one or more additional layers of a different synthetic thermoplastic resin having a melting point of at least about 250° F. can also be employed on (i.e., adhered to) the outward facing surface of the indicated adhesive synthetic thermoplastic resin layer (or layers) so as to form a multilayered synthetic thermoplastic resin coating on one or both surfaces of the steel sheet material. In this latter instance, the indicated adhesive synthetic thermoplastic resin layer would constitute an inner layer in direct contact with the steel sheet material and said different synthetic polymer resin would constitute the outermost layer in such a multilayered coating structure.

The present invention is particularly beneficial in that it facilitates the preparation of retortable draw-redraw food or beverage cans with at least reduced reliance upon organic solvent or plasticizer based coating systems for such purpose.

Moreover, in those instances where film lamination or extrusion coating is employed for both major planar surfaces of the steel sheet material, such invention permits the preparation of retortable plastic coated draw-redraw beverage and food cans totally without the use of organic solvent or plasticizer based coating systems. Further, the present such invention is especially beneficial in that it facilitates the preparation of retortable draw-redraw cans having draw ratio capabilities (i.e., depth to diameter draw ratio capabilities) at least comparable to that obtained with coated steel can sheet stock prepared using the conventional organic solvent or plasticizer based canstock coating systems. In addition, the laminates employed can sometimes obviate the use of the external drawing lubricants which are typically employed in the subject draw-redraw can forming process.

DETAILED DESCRIPTION OF THE INVENTION

In the practice of the present invention, at least one of the two major planar surfaces of the steel sheet material employed has adhered directly thereto a layer of the aforementioned high density polyethylene graft copolymer. Preferably, the remaining major planar surface of said steel sheet material also has a layer of said graft copolymer adhered directly thereto. However, in an alternative embodiment, said remaining major planar surface of such steel sheet material can instead suitably be coated with a layer of some other type of protective organic coating material such as, for example, those organic solvent or plasticizer based polyvinyl chloride, epoxy or epoxy phenolic systems as are conventionally employed for coating steel sheet materials intended for use in the manufacture of draw-redraw food or beverage cans. Moreover, in yet another embodiment such as, for example, in those instances where a lesser degree of gouge resistance, grease resistance, adhesion to the steel sheet material etc. can be tolerated on one surface of the food or beverage can body (e.g., on the outer non-food or beverage contacting surface thereof), said remaining major planar surface of such steel sheet material can be coated (e.g., via extrusion coating or film lamination) with a layer of some other type of thermoplastic polymer material such as, for example, a high density polyethylene resin, a low density polyethylene resin, an ethylene/vinyl acetate copolymer resin, a random ethylene/acrylic acid copolymer resin and the like.

Figure 1:
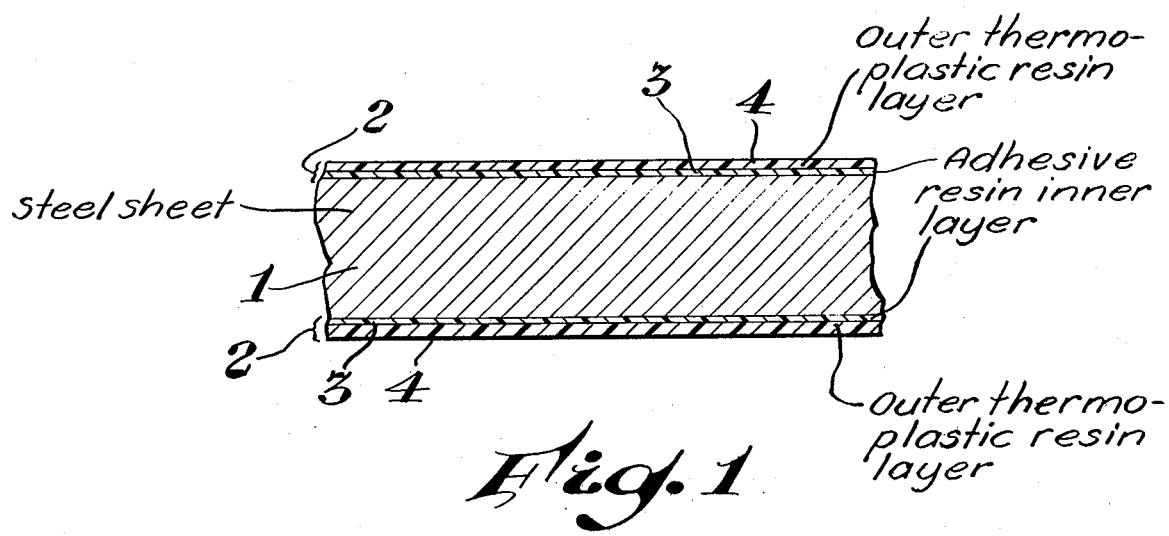
FIG. 1 is a fragmentary sectional view of a coated steel sheet suitable for use in the practice of the present invention.
Figure 2:
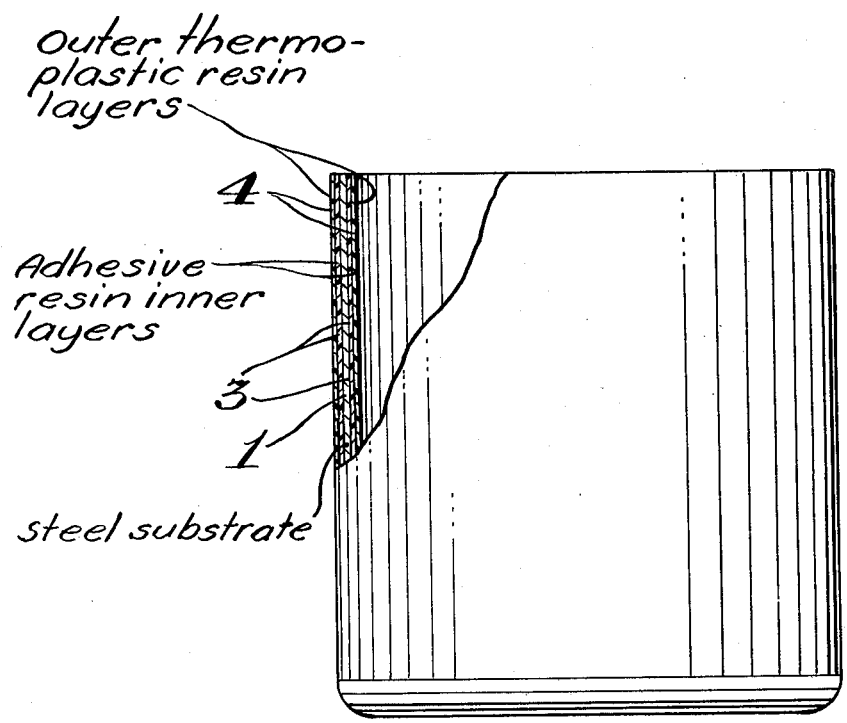
FIG. 2 is a schematic representation, partially in section, of a drawn-redrawn can body made in accordance with the present invention.

As has been indicated, and as is illustrated in FIGS. 1 and 2, the coated steel sheet employed in the practice of the present invention preferably comprises a steel sheet (1) having adhered to both major planar surfaces thereof a synthetic thermoplastic resin coating (2) each of which coatings individually (A) can comprise a single layer of an adhesive synthetic thermoplastic resin (3) which comprises the aforementioned high density polyethylene graft copolymer and which is bonded directly to the surface of said steel sheet or (B) can optionally further comprise an outer layer (4) of a different synthetic thermoplastic polymer resin which has a crystalline melting point of at least about 250° F. and which is adhered to said synthetic thermoplastic adhesive resin layer in the individual thermoplastic resin coatings.

Steel sheet material suitably employed in the practice of the present invention includes any such steel sheet material which exhibits good adhesion to the aforementioned high density polyethylene graft copolymer. Examples of such steel materials include those types of chemically or electrochemically coated (e.g., electrolytically plated) steel sheetstocks already known in the art to be useful in the manufacture of food and beverage containers. Preferably, the steel sheet material employed is a non-ferrous metal coated steel sheet such as chromium/chromium oxide coated steel (also commonly referred to in the art as chrome/chrome oxide coated steel, tin-free steel and as electrolytic chrome coated steel or "ECCS"); which bears a composite coating of chrome and chrome oxide on both major planar surfaces of said steel sheet and various species or versions of which are described in U.S. Pat. Nos. 3,475,295; 3,479,162; 3,526,486; 3,532,608; 3,567,599; 3,755,091; 3,816,082; 3,827,866; 3,828,628; 3,838,024 and Canadian Pat. No. 808,630, the pertinent teachings of which are hereby incorporated by reference.

The thickness of the steel sheet material employed in the practice of the present invention corresponds to that employed in conventional draw-redraw can manufacturing operations and is typically in the range of from about 5 to about 15 mils. Preferably, such thickness is in the range of from about 7 to about 10 mils.

As has been earlier indicated, the adhesive synthetic thermoplastic resin composition employed as a coating layer directly adhered to at least one major planar surface of the steel sheet material in the practice of the present invention has a crystalline melting point of at least about 250° F. (preferably greater than 250° F.) and comprises a graft copolymer of a high density polyethylene resin with from about 0.5 to about 15 weight percent, based upon said copolymer, of an ethylenically unsaturated carboxylic acid monomer. Such composition can consist essentially of the indicated high density polyethylene graft copolymer or it can comprise a blend of such graft copolymer with a different but compatible, synthetic thermoplastic resin (e.g., high density polyethylene, low density polyethylene, etc.) so long as the resulting blend exhibits sufficient adhesion to the steel substrate to avoid delamination therefrom both during the draw-redraw can forming operation itself and under the conditions employed during the subsequent food or beverage canning and/or processing (e.g., retorting) operations. Preferably, such adhesive synthetic thermoplastic resin composition exhibits an initial 90° peel strength at ambient temperature (i.e., 25° C.) of at least about 15 pounds per inch (preferably at least about 20 and most preferably at least about 25 pounds per inch) when measured by ASTM D 1876 in the form of a steel/adhesive resin/steel sandwich construction in which each steel layer has a thickness of 6 mils.

Examples of polyethylene graft copolymer resins suitably employed in the aforementioned adhesive thermoplastic resin composition include graft copolymers of high density polyethylene with from about 0.5 to about 15 (preferably from about 0.5 to about 5) weight percent, based upon such graft copolymer of one or more ethylenically unsaturated carboxylic acid monomers such as, for example, ethylenically unsaturated mono- or polybasic carboxylic acids per se (e.g., acrylic acid, methacrylic acid, crotonic acid, fumaric acid, maleic acid, itaconic acid, etc.); partial esters of polybasic ethylenically unsaturated acids (e.g., monomethyl maleate, monoethyl maleate, monomethyl fumarate, monoethyl fumarate, tripropylene glycol monomethyl ether acid maleate; ethylene glycol monophenol ether acid maleate, etc.); polybasic ethylenically unsaturated carboxylic acid anhydrides (e.g., maleic anhydride, etc.) and the like. In addition, partially neutralized versions of the aforementioned graft copolymers, can also be suitably employed. Further, the foregoing graft copolymers can consist essentially of ethylene homopolymer grafted with the indicated carboxylic acid monomer or, alternatively, the grafting monomer constituent itself and/or the starting polymer to be graft copolymerized therewith, can further comprise a minor amount (e.g., up to about 20 weight percent) of other types of copolymerizable monomers.

As has been noted, the individual plastic coating which is required to be employed on at least one side of the steel sheet material in the practice of the present invention can be composed of a single layer of the above-described graft copolymer adhesive resin composition or can be a multilayered coating in which the inner layer in direct contact with the steel surface is composed of said adhesive resin composition and in which the outer layer is composed of a different synthetic thermoplastic resin composition having a crystalline melting point of at least about (preferably greater than) 250° F.

Examples of synthetic thermoplastic resins suitable for use in the aforementioned ≧250° F. melting point outer layer when multiple layer thermoplastic coatings are employed include high density polyethylene (e.g., having a density in the range of from 0.950 to about 0.965 g/cc and a melt index in the range of from 0.05 to about 5), polypropylene, polyamides, polyethylene terephthalate, ethylene/propylene copolymers and the like. Further, blends of these ≧250° F. melting point resins with lower softening point resins (e.g., low density polyethylene, ethylene/acrylate copolymers, ethylene/vinyl acetate copolymers, random ethylene/acrylic or methacrylic acid copolymers, ionomers, chlorinated polyethylene, etc.) can also be employed so long as the effective melting point of the resulting blend remains at about 250° F. or more. A class of resins which is particularly preferred for use as the outermost coating layers when multilayered plastic coatings are employed is high density polyethylene having densities of from about 0.950 to about 0.965 (preferably from about 0.960 to about 0.965) and melt indexes of from about 0.05 to about 5 (preferably from about 0.05 to about 3) and blends of such high density polyethylenes with up to about 30 weight percent, based upon such blends, of a low density polyethylene resin.

The total thickness of the aforementioned single or multiple layered plastic coating employed on at least one of the major surfaces of the steel sheet material in the practice of the present invention is typically from about 0.2 to about 2.8 mils (preferably from about 0.4 to about 1.6 mils). Further, when the plastic coatings are of a multilayered structure each of the innermost graft copolymer adhesive layers will typically constitute from about 10 to about 70 (preferably from about 20 to about 40) percent of the overall thickness of the individual multilayered coatings and the outermost layer of the different ≧250° F. melting point resin will typically constitute from about 30 to about 90 (preferably from about 60 to about 80) percent of the overall thickness of said multilayered coating.

As has been noted, one of the primary objects of the present invention is to provide a means of at least reducing, and preferably avoiding, the use of organic solvent-based coatings in the manufacture of retortable draw-redraw food and beverage cans. Accordingly, the hereinbefore described plastic coated steel container stock employed in the practice of the present invention is prepared using conventional extrusion coating or film laminating techniques. Further, when the plastic coatings employed are of a multiple layered structure, the individual layers thereof (i.e., the adhesive graft copolymer inner layers and the ≧250° F. melting point outer layers) can be applied separately or they can be applied simultaneously either via coextrusion technology or by lamination of a previously prepared multilayered film of the type desired for the multilayered plastic coating. Preferably, when multiple layered coating structures are employed, the individual layers thereof are applied simultaneously by either coextrusion or multilayer film lamination techniques.

As has been previously indicated, an important feature of the present invention is the provision of plastic coated draw-redraw can bodies which are capable of being retorted (retorting typically involving food or beverage processing in the can at an elevated temperature such as about 250° F. for a prolonged time period such as, for example, an hour or an hour and a half) without damage to, or delamination of, the plastic coatings employed. Thus, the hereinbefore discussed requirement that the graft copolymer adhesive layer (as well as the optionally employed different outer polymer layer when multiple layered coatings are employed) have a melting point of at least about 250° F. is important in order that the resins employed do not become a flowable melt under retorting conditions but instead maintain their integrity as a protective coating layer during such food or beverage processing operations. In addition, it is also important that the outermost surface of the plastic coatings (be it the above-noted adhesive graft copolymer or a different polymer outer layer in a multilayered coating system) be relatively inert or impervious to water and to the various foodstuffs and/or beverages to be ultimately packaged in the subject draw-redraw cans at the can filling temperature as well as at both the elevated temperatures typically employed during the post-canning processing (i.e., retorting) operations and the ambient temperatures encountered during storage pending final consumption of such food or beverage contents. In addition, it is also important that the thermoplastic resin coatings employed possess (a) sufficient strength and toughness to withstand the rather severe stresses imparted thereto during formation of the draw-redraw can body from the instant plastic/steel/plastic laminates, and (b) sufficient adhesiveness to the steel substrate to prevent delamination therefrom during the can-forming operation. Similarly, when multilayered coatings are employed, it is important that the outer resin layer thereof have sufficient adhesion to the inner graft copolymer adhesive layer to prevent delamination therefrom during the can forming operation itself and during the food or beverage processing operations. In some cases, as for example when a high density polyethylene outer layer is used in conjunction with an inner layer of the above-discussed high density polyethylene/carboxylic acid graft copolymer, the direct interlayer adhesion between such layers is generally sufficient to maintain the requisite coating integrity during the can forming process itself and during the post-formation food or beverage canning and processing operations. However, in other cases, as for example, when a nylon outer layer is employed with the graft ethylene/ethylenically unsaturated carboxylic acid copolymer inner layer, the direct adhesion between such layers may not alone be sufficient to withstand the stresses encountered during the can forming and/or canning and processing operations. Accordingly, in this latter type of circumstance, it is generally desirable to employ an intermediate adhesive or compatibilizing layer of a third thermoplastic resin (or of a resin blend) which exhibits good adhesion to both of the resin compositions employed, respectively, in the outer and inner layers of the subject multilayer thermoplastic resin coating.

The use of the hereinbefore described plastic coated steel can stock in the actual can forming operations is conducted generally pursuant to conventional draw-redraw can forming techniques and, naturally, such operation can consist of either a single draw or multiple drawing steps depending upon the ultimate depth of draw (or depth to diameter draw ratio) required for the particular type of can to be formed in such operation.

Similarly, after the draw-redraw cans have been prepared in accordance with the present invention, they are employed in the conventional fashion in their intended ultimate end-use for the canning, processing and storage of various food and/or beverage products.

The practice of the present invention is further illustrated by reference to the following non-limiting working examples.

EXAMPLES 1–3

In these examples, a series of plastic/chrome-chrome oxide coated steel/plastic laminates are prepared by laminating a previously prepared plastic film to both sides of a chrome-chrome oxide coated steel sheet having a thickness of 7.5 mils. The lamination is conducted by preheating the steel sheet to about 400° F. and passing said preheated steel sheet through a set of closed nip rolls already threaded with the two plastic films and by then post-heating the so-formed laminate for 5 minutes in a hot air oven maintained at a temperature of 400° F. Thereafter, the resulting laminate is formed into a 303×307 size can body via a draw-redraw operation and the resulting can body is subjected to a grease and steam resistance testing by filling the can with a grease (i.e., lard) and exposing the filled can to a temperature of 250° F. for 1 hour and by exposure to steam in an autoclave at 250° F. for 1 hour. The film employed in the individual examples, and the steam and grease resistance results for cans formed from laminates made therewith, are summarized in Table 1, below.

TABLE 1

| Example No. | Inner Adhesive Layer Type | Inner Adhesive Layer Thickness | ≧250° F. Melting Point Outer Layer Type | ≧250° F. Melting Point Outer Layer Thickness | Grease Test | Steam Test |
|---|---|---|---|---|---|---|
| 1 | HDPE/AAg[1] | 0.3 mil | HDPE[2] | 0.7 mil | PASSED | PASSED |
| 2 | HDPE/-Anhydride graft copolymer[3] | 0.3 mil | HDPE[2] | 0.7 mil | PASSED | PASSED |
| 3 | Single layer film of HDPE/-AAg[1] | 1 mil | None | None | PASSED | PASSED |

[1]High density polyethylene/acrylic acid graft copolymer containing 8% acrylic acid supplied by Compagnie Francaise du Raffinage.
[2]High density polyethylene (density = 0.965 g/cc and melt index = 0.7).
[3]Anhydride graft modified high density polyethylene commercially available as PLEXAR ® II from the Chemplex Company, Rolling Meadows, Illinois.

While the present invention has been herein described with reference to various specific embodiments and examples thereof, such examples and embodiments are not to be understood as limiting the scope of the instantly claimed invention.

What is claimed is:

1. In a draw-redraw process for forming a steel food or beverage can body, the improvement comprising the use in such process of a laminated or extrusion coated steel sheet material having directly adhered to at least one major planar surface thereof a layer of an adhesive synthetic thermoplastic resin composition having a crystalline melting point of at least about 250° F. and comprising a graft copolymer of high density polyethylene with from about 0.5 to about 15 weight percent, based upon such graft copolymer, of an ethylenically unsaturated carboxylic acid monomer.

2. The process improvement of claim 1 wherein the steel sheet is chrome/chrome oxide coated steel.

3. The process improvement of claim 1 wherein the laminated or extrusion coated steel sheet further comprises an outer thermoplastic resin layer which comprises a high density polyethylene resin having a crystalline melting point of at least about 250° F. and which is adhered to the graft copolymer adhesive resin layer.

4. The process improvement of claim 3, wherein, the graft copolymer adhesive resin layer constitutes from about 10 to about 70 percent of the total thickness of the overall plastic coating.

5. The process improvement of claim 3 wherein the outer thermoplastic polymer layer comprises a high density polyethylene resin having a melt index of from about 0.05 to about 3 and a density of from about 0.960 to about 0.965 g/cc.

6. The process improvement of claim 1, wherein the graft copolymer of the adhesive synthetic thermoplastic resin composition is a high density polyethylene/acrylic acid graft copolymer.

7. The process improvement of claim 1 wherein the steel sheet material has a thickness of from about 5 to about 15 mils.

8. The process improvement of claim 1 wherein the total thickness of each of the plastic coatings on the steel sheet material is from about 0.2 to about 2.8 mils.

9. The process improvement of claim 1 wherein the steel sheet material has a layer of said graft copolymer adhesive resin adhered to both major planar surfaces thereof.

10. A drawn food or beverage container made by a draw-redraw can forming process from a laminated or extrusion coated steel sheet material having directly adhered to at least one major surface thereof a layer of an adhesive synthetic thermoplastic resin composition which has a crystalline melting point of at least about 250° F. and which comprises a graft copolymer of high density polyethylene with from about 0.5 to about 15 weight percent, based upon such graft copolymer, of an ethylenically unsaturated carboxylic acid monomer.

* * * * *